United States Patent
Fleureau et al.

(10) Patent No.: US 12,069,301 B2
(45) Date of Patent: Aug. 20, 2024

(54) METHOD AND APPARATUS FOR ENCODING AND DECODING VOLUMETRIC VIDEO

(71) Applicant: InterDigital CE Patent Holdings, SAS, Paris (FR)

(72) Inventors: Julien Fleureau, Rennes (FR); Bertrand Chupeau, Rennes (FR); Gerard Briand, Ploufragan (FR); Renaud Dore, Rennes (FR); Franck Thudor, Rennes (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 292 days.

(21) Appl. No.: 17/441,051

(22) PCT Filed: Mar. 19, 2020

(86) PCT No.: PCT/EP2020/057700
§ 371 (c)(1),
(2) Date: Sep. 20, 2021

(87) PCT Pub. No.: WO2020/200829
PCT Pub. Date: Oct. 8, 2020

(65) Prior Publication Data
US 2022/0167015 A1    May 26, 2022

(30) Foreign Application Priority Data
Mar. 29, 2019 (EP) .................................. 19305417

(51) Int. Cl.
G06T 15/08      (2011.01)
G06T 17/00      (2006.01)
(Continued)

(52) U.S. Cl.
CPC ........... H04N 19/597 (2014.11); G06T 17/00 (2013.01); H04N 19/147 (2014.11);
(Continued)

(58) Field of Classification Search
CPC ....... G06T 11/001; G06T 17/00; G06T 15/08; G06T 19/00; G06T 2200/04;
(Continued)

(56) References Cited

FOREIGN PATENT DOCUMENTS

| EP | 3349182 A1 | 7/2018 | |
|---|---|---|---|
| EP | 3716628 A1 * | 9/2020 | ............. G06T 9/001 |
| WO | WO 2019055389 A1 | 3/2019 | |

OTHER PUBLICATIONS

Anonymous, Rate-Distortion Optimization (RDO) for Encoder Control, Fraunhofer HHI, retrieved from the internet at: https://www.hhi.fraunhofer.de/en/departments/vca/research-groups/video-coding-technologies/research-topics/past-research-topics/rate-distortion-optimization-rdo-for-encoder-control.html, 2017, 3 pages.
(Continued)

*Primary Examiner* — Antonio A Caschera
(74) *Attorney, Agent, or Firm* — Volpe Koenig (57) ABSTRACT

A patch-based atlas format in intra-periods of varying length is used to encode a volumetric video. A first atlas layout is built for a first sequence of 3D scenes. The number of 3D scenes in the sequence is chosen to fit the size of a Group of Pictures of the codec. A second sequence is iteratively set up by appending the next 3D scene of the sequence to encode while the number of patches of the layout built for this iterative second sequence is lower than or equal to the number of patches of the first layout. When iterations end, one of the layouts is selected to generate every atlas of the group. In such a way, size of metadata is decreased, and compression is enhanced.

12 Claims, 4 Drawing Sheets

(51) Int. Cl.
| | |
|---|---|
| *H04N 19/147* | (2014.01) |
| *H04N 19/177* | (2014.01) |
| *H04N 19/46* | (2014.01) |
| *H04N 19/593* | (2014.01) |
| *H04N 19/597* | (2014.01) |
| *G06T 19/00* | (2011.01) |

(52) U.S. Cl.
CPC ........... *H04N 19/177* (2014.11); *H04N 19/46* (2014.11); *H04N 19/593* (2014.11); *G06T 15/08* (2013.01); *G06T 19/00* (2013.01); *G06T 2200/04* (2013.01); *G06T 2207/10028* (2013.01)

(58) Field of Classification Search
CPC ........ G06T 2207/10028; H04N 19/597; H04N 19/147; H04N 19/177; H04N 19/46; H04N 19/593
See application file for complete search history.

(56) References Cited

OTHER PUBLICATIONS

Sullivan et al., "Rate-Distortion Optimization for Video Compression", IEEE Signal Processing Magazine, vol. 15, Issue 6, Nov. 1998, pp. 74-90.

Lavoue et al., "On the Efficiency of Image metrics for Evaluating the Visual Quality of 3D Models", IEEE Transactions on Visualization and Computer Graphics, vol. 22, No. 8, Aug. 2016, 14 pages.

Anonymous, "Part 12: ISO Base Media File Format", International Organization for Standardization (ISO) & International Electrotechnical Commission (IEC), Information Technology—Coding of audio-visual objects, International Standard ISO/IEC 14496-12, Fifth Edition, Feb. 20, 2015, 256 pages.

Sanchez et al., "Profiles under Considerations for ISO/IEC 23000-20 Omnidirectional Media Format", International Organization for Standardization ISO/IEC JTC1/SC29/WG11, Coding of Moving Pictures and Audio, Document N16952, Torino, Italy, Jul. 2017, 54 pages.

* cited by examiner

METHOD AND APPARATUS FOR ENCODING AND DECODING VOLUMETRIC VIDEO

This application claims the benefit, under 35 U.S.C. § 371 of International Application PCT/EP2020/057700, filed Mar. 19, 2020, which was published in accordance with PCT Article 21(2) on Oct. 8, 2020, in English, and which claims the benefit of European Patent Application No. 19305417.8, filed Mar. 29, 2019.

1. TECHNICAL FIELD

The present principles generally relate to the domain of three-dimensional (3D) scene and volumetric video content. The present document is also understood in the context of the encoding, the formatting and the decoding of data representative of the texture and the geometry of a 3D scene for a rendering of volumetric content on end-user devices such as mobile devices or Head-Mounted Displays (HMD).

2. BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

Recently there has been a growth of available large field-of-view content (up to 360°). Such content is potentially not fully visible by a user watching the content on immersive display devices such as Head Mounted Displays, smart glasses, PC screens, tablets, smartphones and the like. That means that at a given moment, a user may only be viewing a part of the content. However, a user can typically navigate within the content by various means such as head movement, mouse movement, touch screen, voice and the like. It is typically desirable to encode and decode this content.

Immersive video, also called 360° flat video, allows the user to watch all around himself through rotations of his head around a still point of view. Rotations only allow a 3 Degrees of Freedom (3DoF) experience. Even if 3DoF video is sufficient for a first omnidirectional video experience, for example using a Head-Mounted Display device (HMD), 3DoF video may quickly become frustrating for the viewer who would expect more freedom, for example by experiencing parallax. In addition, 3DoF may also induce dizziness because of a user never only rotates his head but also translates his head in three directions, translations which are not reproduced in 3DoF video experiences.

A large field-of-view content may be, among others, a three-dimension computer graphic imagery scene (3D CGI scene), a point cloud or an immersive video. Many terms might be used to design such immersive videos: Virtual Reality (VR), 360, panoramic, 4π steradians, immersive, omnidirectional or large field of view for example.

Volumetric video (also known as 6 Degrees of Freedom (6DoF) video) is an alternative to 3DoF video. When watching a 6DoF video, in addition to rotations, the user can also translate his head, and even his body, within the watched content and experience parallax and even volumes. Such videos considerably increase the feeling of immersion and the perception of the scene depth and prevent from dizziness by providing consistent visual feedback during head translations. The content is created by the means of dedicated sensors allowing the simultaneous recording of color and depth of the scene of interest. The use of rig of color cameras combined with photogrammetry techniques is a way to perform such a recording, even technical difficulties remain.

While 3DoF videos comprise a sequence of images resulting from the un-mapping of texture images (e.g. spherical images encoded according to latitude/longitude projection mapping or equirectangular projection mapping), 6DoF video frames embed information from several points of views. They can be viewed as a temporal series of point clouds resulting from a three-dimension capture. Two kinds of volumetric videos may be considered depending on the viewing conditions. A first one (i.e. complete 6DoF) allows a complete free navigation within the video content whereas a second one (aka. 3DoF+) restricts the user viewing space to a limited volume called viewing bounding box, allowing limited translation of the head and parallax experience. This second context is a valuable trade-off between free navigation and passive viewing conditions of a seated audience member.

A technical approach for the encoding of volumetric video is based on the projection of the 3D scene onto a multiplicity of 2D images, called patches, packed into atlases which can be further compressed using conventional video encoding standards (e.g., HEVC). Patches are packed in an atlas following the organization of a given layout. The atlas is encoded in the data stream in association with metadata describing its layout; that is a description of the location, the shape and the size of each patch within the atlas. These metadata have a non-negligible size as an atlas may comprises several hundreds of patches. To limit the size of layout metadata, an approach consists in using a same layout for a given number of successive atlases corresponding to the projection of the same number of successive 3D scene of the volumetric sequence. This number is selected to fit the number of frames in a Group of Picture (GoP) of a chosen codec, for example 8 or 12. Even when dividing the number of layout metadata by this number, the size of these data remains important. A technique for reducing the size of layout data in an atlas based encoding of volumetric video without decreasing the quality of the encoded sequence is lacking.

3. SUMMARY

The following presents a simplified summary of the present principles to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

The present principles relate a method comprising obtaining a first atlas layout for a first sequence of 3D scenes. An atlas layout defines an organization of at least one patch within an atlas that is image data representative of at least one patch of a same 3D scene. A patch is image data representative of a projection of a part of a 3D scene onto an image plane. So, different projections of different parts of a 3D scene provide a set of patches. These patches are packed in a bigger image called atlas. The organization of the patches within their atlas is called the atlas layout. The method also comprises obtaining a second atlas layout for a second sequence of 3D scenes. This second sequence is the first sequence to which the next 3D scene of the sequence of 3D scene to encode is appended. If the number of patches of the second atlas layout is greater than the number of patches of the first atlas layout, then, the method generates atlases for the first sequence of 3D scenes according to the first atlas layout. Otherwise, the method selects a layout among the first and the second layout and generates atlases for the second sequence of 3D scenes according to the selected layout.

In a particular embodiment, obtaining atlas layouts steps are iterated while the number of patches of the second atlas layout is lower than or equal to the number of patches of the first atlas layout, the first sequence of 3D scenes becoming the second sequence of 3D scene of the preceding iteration. While iterating, the method stores the obtained first atlas layouts at each iteration. When iterations end, a layout is selected among the stored layouts and atlases for the last first sequence of 3D scenes are generated according to this selected atlas layout. In a variant, a given number is set to be the maximal number of atlases generated according to a same atlas layout. In this case, the iterations of the method end when the second sequence comprises more than this given number of 3D scenes.

According to a particular embodiment, the selecting of a layout among several is performed on the basis of a rate-distortion optimization criterion. According to a particular embodiment, generated atlases are encoded as one variable-size intra-period in a video data stream.

The present principles also relate to a device comprising a memory storing instructions to cause a processor to implement the steps of the method. The present principles also relate to a video data stream generated by such a device.

4. BRIEF DESCRIPTION OF DRAWINGS

The present disclosure will be better understood, and other specific features and advantages will emerge upon reading the following description, the description making reference to the annexed drawings wherein.

5. DETAILED DESCRIPTION OF EMBODIMENTS

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims. While not explicitly described, the present examples and variants may be employed in any combination or sub-combination.

According to the present principles, methods and devices for encoding and decoding volumetric video in an atlas-based format are disclosed herein. 3D scenes are projected onto a multiplicity of 2D images, called patches, packed into atlases according to a layout. According to the present principles, a same layout organizing patches in atlases is used for a varying number of successive atlases encoding successive 3D scenes of the sequence.

Figure 1:
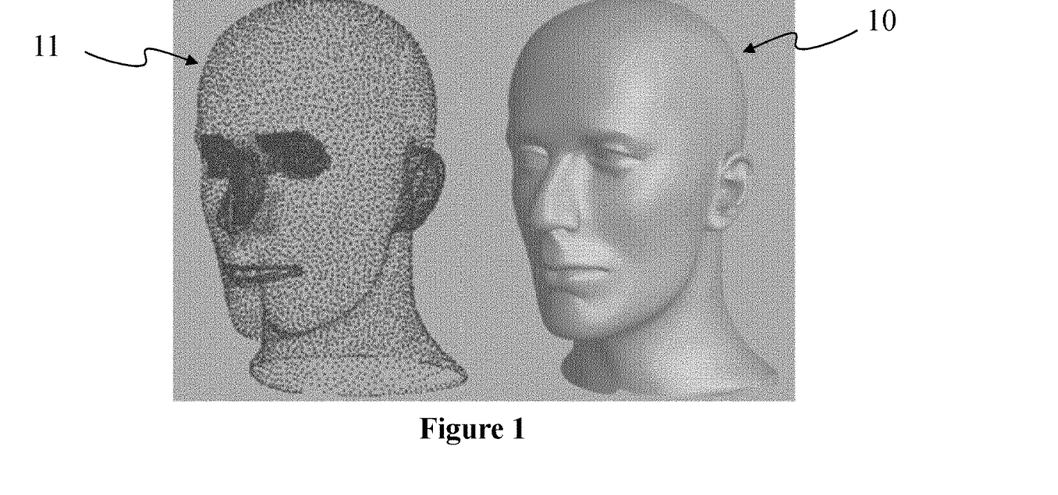
FIG. 1 shows a three-dimension (3D) model of an object and points of a point cloud corresponding to the 3D model, according to a non-limiting embodiment of the present principles.

FIG. 1 shows a three-dimension (3D) model 10 of an object and points of a point cloud 11 corresponding to 3D model 10. 3D model 10 and the point cloud 11 may for example correspond to a possible 3D representation of an object of the 3D scene comprising other objects. Model 10 may be a 3D mesh representation and points of point cloud 11 may be the vertices of the mesh. Points of point cloud 11 may also be points spread on the surface of faces of the mesh. Model 20 may also be represented as a splatted version of point cloud 11, the surface of model 10 being created by splatting the points of the point cloud 11. Model 10 may be represented by a lot of different representations such as voxels or splines. FIG. 1 illustrates the fact that a point cloud may be defined with a surface representation of a 3D object and that a surface representation of a 3D object may be generated from a point of cloud. As used herein, projecting points of a 3D object (by extension points of a 3D scene) onto an image is equivalent to projecting any representation of this 3D object, for example a point cloud, a mesh, a spline model or a voxel model.

A point cloud may be represented in memory, for instance, as a vector-based structure, wherein each point has its own coordinates in the frame of reference of a viewpoint (e.g. three-dimensional coordinates XYZ, or a solid angle and a distance (also called depth) from/to the viewpoint) and one or more attributes, also called component. An example of component is the color component that may be expressed in various color spaces, for example RGB (Red, Green and Blue) or YUV (Y being the luma component and UV two chrominance components). The point cloud is a representation of a 3D scene comprising objects. The 3D scene may be seen from a given viewpoint or a range of viewpoints. The point cloud may be obtained by many ways, e.g.:
- from a capture of a real object shot by a rig of cameras, optionally complemented by depth active sensing device;
- from a capture of a virtual/synthetic object shot by a rig of virtual cameras in a modelling tool;
- from a mix of both real and virtual objects.

Figure 2:
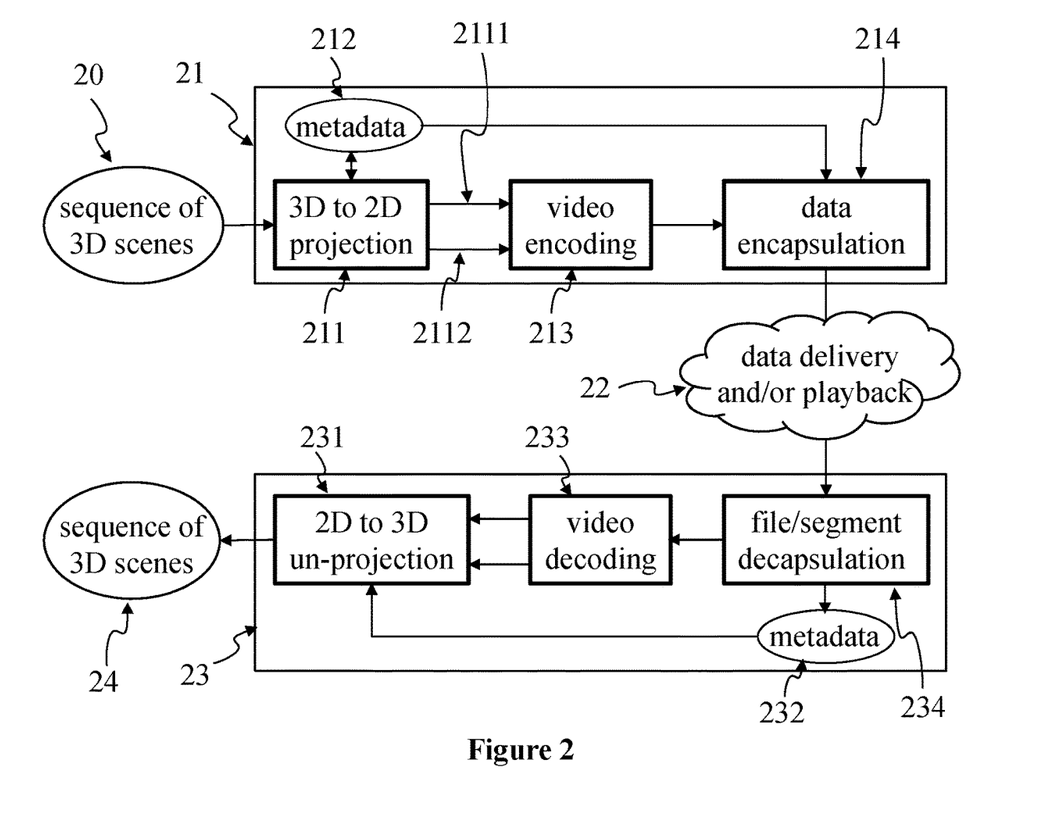
FIG. 2 shows a non-limitative example of the encoding, transmission and decoding of data representative of a sequence of 3D scenes, according to a non-limiting embodiment of the present principles.

FIG. 2 shows a non-limitative example of the encoding, transmission and decoding of data representative of a sequence of 3D scenes. The encoding format that may be, for example and at the same time, compatible for 3DoF, 3DoF+ and 6DoF decoding.

A sequence of 3D scenes 20 is obtained. As a sequence of pictures is a 2D video, a sequence of 3D scenes is a 3D (also called volumetric) video. A sequence of 3D scenes may be provided to a volumetric video rendering device for a 3DoF, 3Dof+ or 6DoF rendering and displaying.

Sequence of 3D scenes 20 is provided to an encoder 21. The encoder 21 takes one 3D scenes or a sequence of 3D scenes as input and provides a bit streams representative of the input. The bit stream may be stored in a memory 22 and/or on an electronic data medium and may be transmitted over a network 22. The bit stream representative of a sequence of 3D scenes may be read from a memory 22 and/or received from a network 22 by a decoder 23. Decoder 23 is inputted by said bit stream and provides a sequence of 3D scenes, for instance in a point cloud format.

Encoder 21 may comprise several circuits implementing several steps. In a first step, encoder 21 projects each 3D scene onto at least one 2D picture. 3D projection is any method of mapping three-dimensional points to a two-dimensional plane. As most current methods for displaying graphical data are based on planar (pixel information from several bit planes) two-dimensional media, the use of this type of projection is widespread, especially in computer graphics, engineering and drafting. Projection circuit 211 provides at least one two-dimensional frame 2111 for a 3D scene of sequence 20. Frame 2111 comprises color information and depth information representative of the 3D scene projected onto frame 2111. In a variant, color information and depth information are encoded in two separate frames 2111 and 2112.

Metadata 212 are used and updated by projection circuit 211. Metadata 212 comprise information about the projection operation (e.g. projection parameters) and about the way color and depth information is organized within frames 2111 and 2112 as described in relation to FIGS. 5 to 7. According to the present principles, 3D scenes are projected onto a multiplicity of 2D images, called patches, packed into atlases. A same layout organizing patches in atlases is used for a varying number of successive atlases encoding successive 3D scenes of the sequence.

A video encoding circuit 213 encodes sequence of frames 2111 and 2112 as a video. Pictures of a 3D scene 2111 and 2112 (or a sequence of pictures of the 3D scene) is encoded in a stream by video encoder 213. Then video data and metadata 212 are encapsulated in a data stream by a data encapsulation circuit 214.

Encoder 213 is for example compliant with an encoder such as:
  JPEG, specification ISO/CEI 10918-1 UIT-T Recommendation T.81, https://www.itu.int/rec/T-REC-T.81/en;
  AVC, also named MPEG-4 AVC or h264. Specified in both UIT-T H.264 and ISO/CEI MPEG-4 Part 10 (ISO/CEI 14496-10), http://www.itu.int/rec/T-REC-H.264/en,HEVC (its specification is found at the ITU website, T recommendation, H series, h265, http://www.itu.int/rec/T-REC-H.265-201612-I/en);
  3D-HEVC (an extension of HEVC whose specification is found at the ITU website, T recommendation, H series, h265, http://www.itu.int/rec/T-REC-H.265-201612-I/en annex G and I);
  VP9 developed by Google; or
  AV1 (AOMedia Video 1) developed by Alliance for Open Media.

The data stream is stored in a memory that is accessible, for example through a network 22, by a decoder 23. Decoder 23 comprises different circuits implementing different steps of the decoding. Decoder 23 takes a data stream generated by an encoder 21 as an input and provides a sequence of 3D scenes 24 to be rendered and displayed by a volumetric video display device, like a Head-Mounted Device (HMD). Decoder 23 obtains the stream from a source 22. For example, source 22 belongs to a set comprising:
- a local memory, e.g. a video memory or a RAM (or Random-Access Memory), a flash memory, a ROM (or Read Only Memory), a hard disk;
- a storage interface, e.g. an interface with a mass storage, a RAM, a flash memory, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth® interface); and
- a user interface such as a Graphical User Interface enabling a user to input data.

Decoder 23 comprises a circuit 234 for extract data encoded in the data stream. Circuit 234 takes a data stream as input and provides metadata 232 corresponding to metadata 212 encoded in the stream and a two-dimensional video. The video is decoded by a video decoder 233 which provides a sequence of frames. Decoded frames comprise color and depth information. In a variant, video decoder 233 provides two sequences of frames, one comprising color information, the other comprising depth information. A circuit 231 uses metadata 232 to un-project color and depth information from decoded frames to provide a sequence of 3D scenes 24. Sequence of 3D scenes 24 corresponds to sequence of 3D scenes 20, with a possible loss of precision related to the encoding as a 2D video and to the video compression.

Figure 3:
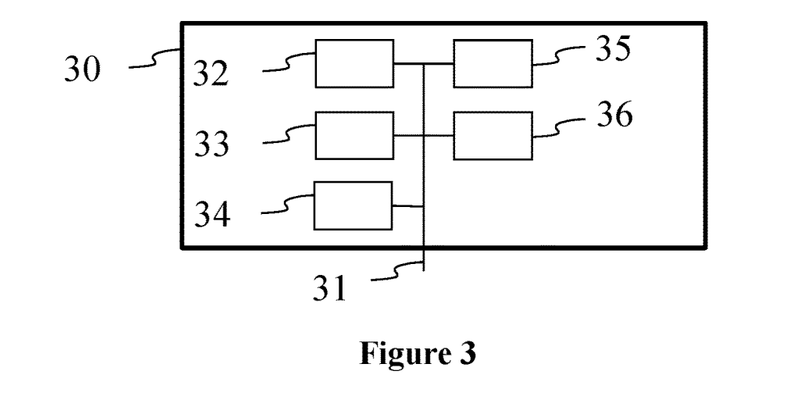
FIG. 3 shows an example architecture of a device which may be configured to implement a method described in relation with FIG. 8, according to a non-limiting embodiment of the present principles.
Figure 8:
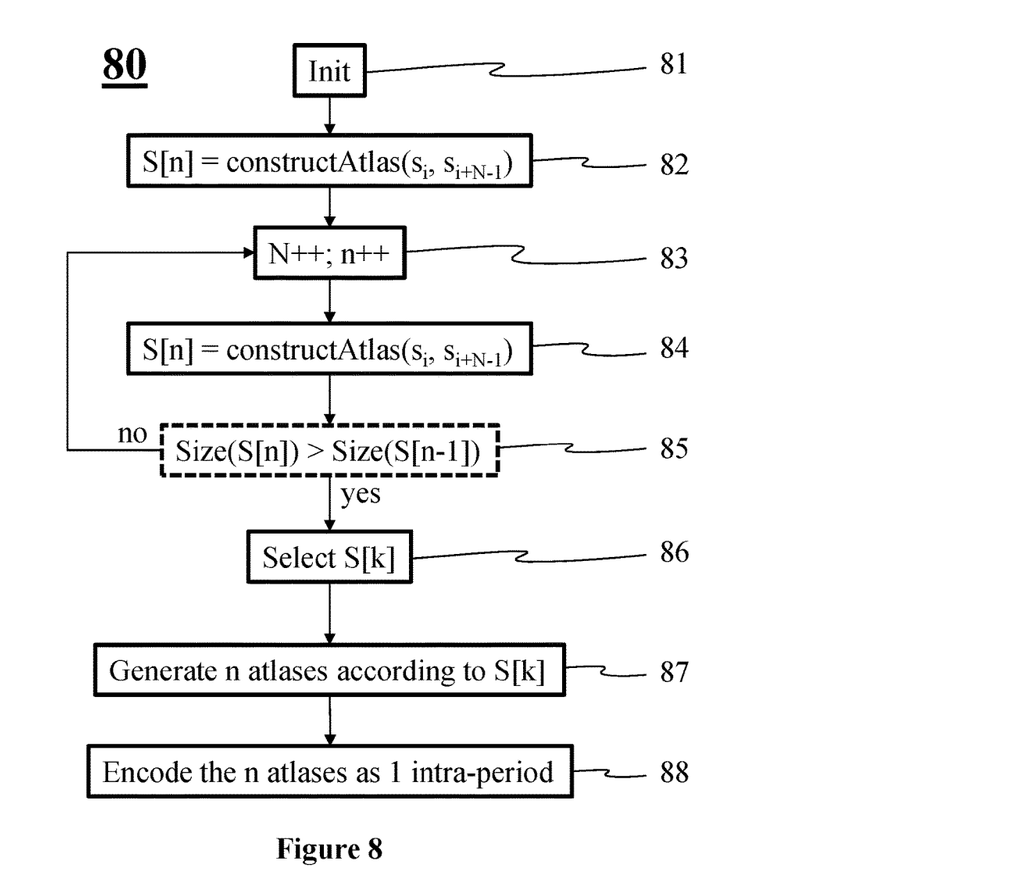
FIG. 8 illustrates a method 80 of encoding a sequence of 3D scenes in a data stream according to a non-limitative embodiment of the present principles.

FIG. 3 shows an example architecture of a device 30 which may be configured to implement a method described in relation with FIG. 8. Encoder 21 and/or decoder 23 of FIG. 2 may implement this architecture. Alternatively, each circuit of encoder 21 and/or decoder 23 may be a device according to the architecture of FIG. 3, linked together, for instance, via their bus 31 and/or via I/O interface 36.

Device 30 comprises following elements that are linked together by a data and address bus 31:
- a microprocessor 32 (or CPU), which is, for example, a DSP (or Digital Signal Processor);
- a ROM (or Read Only Memory) 33;
- a RAM (or Random Access Memory) 34;
- a storage interface 35;
- an I/O interface 36 for reception of data to transmit, from an application; and
- a power supply, e.g. a battery.

In accordance with an example, the power supply is external to the device. In each of mentioned memory, the word «register» used in the specification may correspond to area of small capacity (some bits) or to very large area (e.g. a whole program or large amount of received or decoded data). The ROM 33 comprises at least a program and parameters. The ROM 33 may store algorithms and instructions to perform techniques in accordance with present principles. When switched on, the CPU 32 uploads the program in the RAM and executes the corresponding instructions.

The RAM 34 comprises, in a register, the program executed by the CPU 32 and uploaded after switch-on of the device 30, input data in a register, intermediate data in different states of the method in a register, and other variables used for the execution of the method in a register.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with examples, the device 30 is configured to implement a method described in relation with FIG. 8, and belongs to a set comprising:
- a mobile device;
- a communication device;
- a game device;
- a tablet (or tablet computer);
- a laptop;
- a still picture camera;
- a video camera;
- an encoding chip;
- a server (e.g. a broadcast server, a video-on-demand server or a web server).

Figure 4:
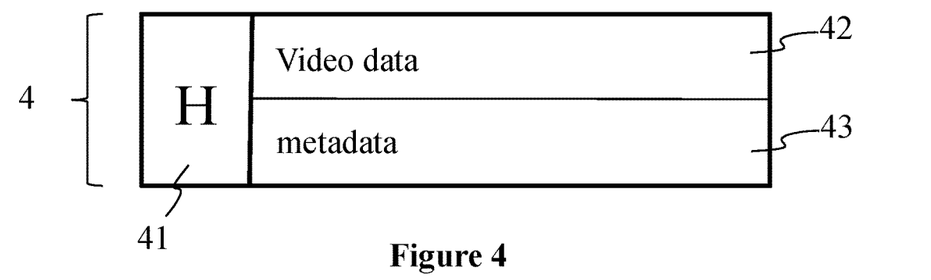
FIG. 4 shows an example of an embodiment of the syntax of a stream when the data are transmitted over a packet-based transmission protocol, according to a non-limiting embodiment of the present principles.

FIG. 4 shows an example of an embodiment of the syntax of a stream when the data are transmitted over a packet-based transmission protocol. FIG. 4 shows an example structure 4 of a volumetric video stream. The structure consists in a container which organizes the stream in independent elements of syntax. The structure may comprise a header part 41 which is a set of data common to every syntax elements of the stream. For example, the header part comprises some of metadata about syntax elements, describing the nature and the role of each of them. The header part may also comprise a part of metadata 212 of FIG. 2, for instance the coordinates of a central point of view used for projecting points of a 3D scene onto frames 2111 and 2112. The structure comprises a payload comprising an element of syntax 42 and at least one element of syntax 43. Syntax element 42 comprises data representative of the color and depth frames. Images may have been compressed according to a video compression method.

Element of syntax 43 is a part of the payload of the data stream and may comprise metadata about how frames of element of syntax 42 are encoded, for instance parameters used for projecting and packing points of a 3D scene onto frames. Such metadata may be associated with each frame of the video or to group of frames (also known as Group of Pictures (GoP) in video compression standards).

Figure 5:
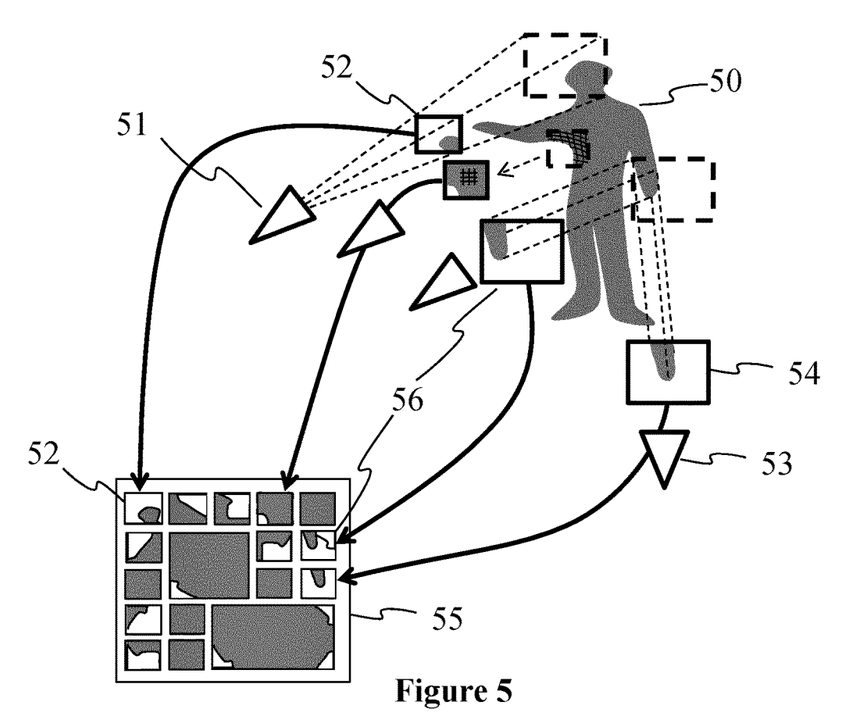
FIG. 5 illustrates the patch atlas approach with an example of 4 projection centers, according to a non-limiting embodiment of the present principles.

FIG. 5 illustrates the patch atlas approach with an example of 4 projection centers. 3D scene 50 comprises a character. For instance, center of projection 51 is a perspective camera and camera 53 is an orthographic camera. Cameras may also be omnidirectional cameras with, for instance a spherical mapping (e.g. Equi-Rectangular mapping) or a cube mapping. The 3D points of the 3D scene are projected onto the 2D planes associated with virtual cameras located at the projection centers, according to a projection operation described in projection data of metadata. In the example of FIG. 5, projection of the points captured by camera 51 is mapped onto patch 52 according to a perspective mapping and projection of the points captured by camera 53 is mapped onto patch 54 according to an orthographic mapping.

The clustering of the projected pixels yields a multiplicity of 2D patches, which are packed in a rectangular atlas 55. The organization of patches within the atlas defines the atlas layout. In an embodiment, two atlases with identical layout: one for texture (i.e. color) information and one for depth information. Two patches captured by a same camera or by two distinct cameras may comprise information representative of a same part of the 3D scene, like, for instance patches 54 and 56.

The packing operation produces a patch data for each generated patch. A patch data comprises a reference to a projection data (e.g. an index in a table of projection data or a pointer (i.e. address in memory or in a data stream) to a projection data) and information describing the location and the size of the patch within the atlas (e.g. top left corner coordinates, size and width in pixels). Patch data items are added to metadata to be encapsulated in the data stream in association with the compressed data of the one or two atlases. The set of patch data items is also called the layout metadata in the present description.

Figure 6:
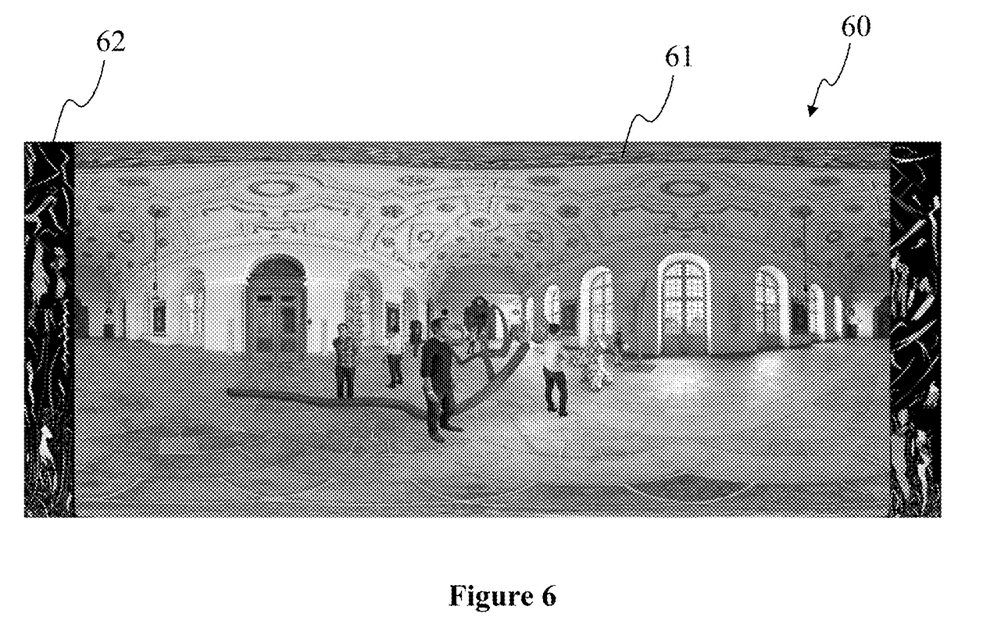
FIG. 6 shows an example of an atlas comprising the texture information of the points of a 3D scene, according to a non-limiting embodiment of the present principles.

FIG. 6 shows an example of an atlas 60 comprising the texture information (e.g. RGB data or YUV data) of the points of a 3D scene, according to a non-limiting embodiment of the present principles. As explained in relation to FIG. 5, an atlas is an image packing patches, a patch being a picture obtained by projecting a part of the points of the 3D scene. The layout of the atlas is metadata describing the location, the shape and the size of patches within the atlas. In an embodiment, the shape of a patch is a rectangle by default, so the shape has not to be described, this information can be omitted in the layout metadata. In this embodiment, the location may be the top left coordinates of the patch rectangle in pixels of the atlas and its size described by a width and a height in pixels. In a variant, the size of a patch is described in arc degrees corresponding to the solid angle of the 3D space, pointing on a projection center, comprising points projected onto that patch. In other embodiments, patches are ellipses and/or polygons, described, for instance with Scalable Vector Graphics (SVG) instructions.

In the example of FIG. 6, atlas 60 comprises a first part 61 comprising the texture information of the points of the 3D scene that are visible from a point of view and one or more second parts 62. The texture information of the first part 61 may for example be obtained according to an equirectangular projection mapping, an equirectangular projection mapping being an example of spherical projection mapping. In the example of FIG. 6, the second parts 62 are arranged at the left and right borders of the first part 61 but the second parts may be arranged differently. Second parts 62 comprise texture information of parts of the 3D scene that are complementary to the part visible from the point of view. The second parts may be obtained by removing from the 3D scene the points that are visible from the first viewpoint (the texture of which being stored in the first part) and by projecting the remaining points according to the same point of view. The latter process may be reiterated iteratively to obtain at each time the hidden parts of the 3D scene. According to a variant, the second parts may be obtained by removing from the 3D scene the points that are visible from the point of view, for example a central point of view, (the texture of which being stored in the first part) and by projecting the remaining points according to a point of view different from the first point of view, for example from one or more second point of view of a space of view centred onto the central point of view (e.g. the viewing space of a 3DoF rendering).

The first part 61 may be seen as a first large texture patch (corresponding to a first part of the 3D scene) and the second parts 62 comprises smaller textures patches (corresponding to second parts of the 3D scene that are complementary to the first part). Such an atlas has the advantage to be compatible at the same time with 3DoF rendering (when rendering only the first part 61) and with 3DoF+/6DoF rendering.

Figure 7:
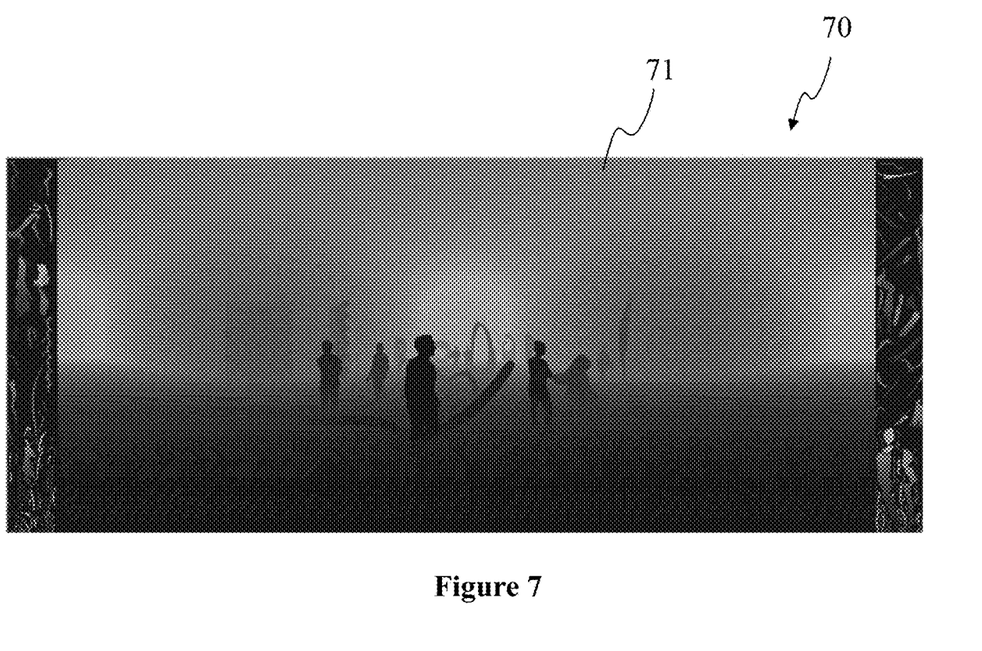
FIG. 7 shows an example of an atlas comprising the depth information of the points of the 3D scene of FIG. 6, according to a non-limiting embodiment of the present principles.

FIG. 7 shows an example of an atlas 70 comprising the depth information of the points of the 3D scene of FIG. 6, according to a non-limiting embodiment of the present principles. Atlas 70 may be seen as the depth image corresponding to texture image 60 of FIG. 6.

Atlas 70 comprises a first part 71 comprising the depth information of the points of the 3D scene that are visible from the central point of view and one or more second parts 62. Atlas 70 may be obtained in a same way as atlas 60 but contains the depth information associated with the points of the 3D scene instead of the texture information.

For 3DoF rendering of the 3D scene, only one point of view, typically the central point of view, is considered. The user may rotate his head in three degrees of freedom around the first point of view to watch various parts of the 3D scene, but the user cannot move this unique point of view. Points of the scene to be encoded are points which are visible from this unique point of view, and only the texture information is needed to be encoded/decoded for the 3DoF rendering. There is no need to encode points of the scene that are not visible from this unique point of view for a 3DoF rendering as the user cannot access to them.

With regard to 6DoF rendering, the user may move the viewpoint everywhere in the scene. In this case, it is required to encode every point (depth and texture) of the scene in the bitstream as every point is potentially accessible by a user who can move his/her point of view. At the encoding stage, there is no means to know, a priori, from which point of view the user will observe the 3D scene.

With regard to 3DoF+ rendering, the user may move the point of view within a limited space around a central point of view. This enables to experience parallax. Data representative of the part of the scene visible from any point of the space of view is to be encoded into the stream, including the data representative of the 3D scene visible according to the central point of view (i.e. the first parts 61 and 71). The size and shape of the space of view may for example be decided and determined at the encoding step and encoded in the bitstream. The decoder may obtain this information from the bitstream and the renderer limits the space of view to the space determined by the obtained information. According to another example, the renderer determines the space of view according to hardware constraints, for example in relation to capabilities of the sensor(s) that detects the movements of the user. In such a case, if, at the encoding phase, a point visible from a point within the space of view of the renderer has not been encoded in the bitstream, this point will not be rendered. According to a further example, data (e.g. texture and/or geometry) representative of every point of the 3D scene is encoded in the stream without considering the rendering space of view. To optimize the size of the stream, only a subset of the points of the scene may be encoded, for instance the subset of points that may be seen according to a rendering space of view.

The parameters of the projection surfaces of FIG. 5 may change frequently over time, in order to adapt to the pose and geometry changes between 3D scenes of the sequence. These parameters are selected by the projection algorithm as a function of criteria to obey, like the number of patch or a rate of redundancy in projected information. From one 3D scene to its successor in the sequence, these parameters may change leading to a modification of the number and/or the size of patches and, transitively modifying the atlas structure and the related layout metdata. To limit these changes, the projection parameters are evaluated per small fixed-length segments of N consecutive frames (typically N is equal to 8). The transmitted un-projection parameters, including the layout metadata (i.e. patch data items) are therefore regularly updated every N frames. Furthermore, the encoding structure of the video streams made up of the sequence of depth and texture patch atlases is adapted accordingly, with aligned fixed size, N-frame long, closed GOPs. Doing so, the encoding efficiency is optimized by resetting the temporal predictions at each video content changes (i.e. patch atlases structure updates, which create "scene cuts" in the atlas videos). Such a method of update of projection surface parameters at fixed time instants, every N frames, is sub-optimal in terms of transmission bit-rate, as a given projection surface (and so an atlas layout) could be valid for a much longer duration. Provided the 3D geometry of the scene do not change too fast:

The metadata bit-rate may be decreased by avoiding un-necessary updates of un-projection parameters;

The video compression efficiency of projected depth and texture atlases may be significantly improved by avoiding too frequent un-necessary scene changes (corresponding to atlases structure updates) and adapting the encoding parameters accordingly.

According to the present principles, instead of estimating the parameters of the patch-based projection surface best adapted to fixed-length groups of N successive point clouds (and so determining an atlas layout for N successive atlases), the number N of successive frames varies over time, depending on the temporal evolution of the scene geometry.

FIG. 8 illustrates a method 80 of encoding a sequence of 3D scenes in a data stream according to a non-limitative embodiment of the present principles.

At a step 81, data are obtained from a source. For example, a sequence of 3D scenes is obtained. Variables are initialized. In particular, a first sequence of consecutive 3D scenes is selected. The size N of the first sequence may be set to the size of a GoP for the codec selected to encode the atlases representative of the 3D scenes, for instance N=8 for HEVC. A maximal size may be initialized too. So, 3D scenes of the first sequences goes from index i to index i+N−1, where i is the index of the first 3D scene of the first sequence. An index n is initialized to 0 for the purpose of the clarity of the present description.

At a step 82 an atlas layout is built for the first sequence according to a known method. A set of patches is generated by projecting points of the 3D scenes onto projection surfaces as illustrated in FIG. 5. Patches are packed in N atlases according to a same layout. The number of patches packed in each atlas is called the size of the layout. The obtained layout is stored in a table S in a memory at index n. At a step 83, n is incremented. A second sequence of 3D scenes is built by appending the i+N scene of the sequence to the first sequence. That is, the upcoming 3D scene is added to the first sequence to form the second sequence. N is incremented also. At a step 84, a new atlas layout is built for the second sequence. This second layout is stored in the table of layouts at index n (which has been incremented).

At a step 85, the size of the second layout S[n] is compared to the size of the first layout S [n−1]. If the number of patches of the second layout is lower than or equal to the number of patches of the first layout, then the method iterates at step 83. N and N are incremented, the second sequence becomes the first sequence and a new second sequence is set up by appending the next 3D scene to the new first sequence. An atlas layout is built for this new second sequence and is stored in table S. The method iterates while the size of S[n] is lower than or equal to S [n−1]. In a variant, the iterations end when the second sequence comprises a number of 3D scenes which exceeds a given number, for example 9, 10, 128, 256 or 512. This given number may be defined in accordance to the maximal intra-period size of the codec selected to encode the atlases.

At a step 86, table S comprises n+1 layouts. The last one (i.e. the layout built for the last second sequence) is removed as its number of patches exceeds the number of patches of the first layout (or because the number of stored layouts exceeds the maximal intra period size by one in the variant). One of these layout is selected to be used to generate the n atlases for the last first sequence. The selected layout may be the last or the layout stored in the table. In another embodiment, when n multiple successive layouts {S[k]}, k∈ [1, K], have been estimated, the method selects the atlas layout of patches generating texture and depth atlas videos with best compression properties at step 87. First it is verified for each computed atlas layout whether all points from final point cloud segment [1, N] can be paired with one of its patches, thus yielding a group of valid candidate patch sets {S[k]}, k∈ [1, K'], K'≤K. Then depth and texture atlas video for each incremental sequences of 3D scenes are encoded with same encoding parameters (i.e. in one single GOP) for each candidate patch set, and the patch set with best compression properties is chosen. The bit-rate only is considered and the patch set yielding the smallest compressed atlases file size R is selected. In a variant, a rate distortion optimization (RDO; like in G. Sullivan and T. Wiegand, "Rate-distortion optimization for video compression") approach is followed, by selecting the atlas layout S* minimizing a distortion measure D, subject to a constraint Rc on the number of bits used R as described by equation Eq1.

$$S^* = \underset{S \in \{S^k\}, k \in [1, K']}{\mathrm{argmin}} \{D(S)\}, \text{ subject to } R < R_c \quad \text{Eq 1}$$

This optimization task can be solved using Lagrangian optimization where a distortion term is weighted against a rate term like in Eq2.

$$S^* = \underset{S \in \{S^k\}, k \in [1, K']}{\mathrm{argmin}} \{D(S) + \lambda R\} \quad \text{Eq 2}$$

Each solution to equation Eq2 for a given value of the Lagrangian multiplier λ is a solution of equation Eq1 for a given constraint Rc.

A distortion measure D is therefore required. An image-based criterion based on rendered images on user viewport(s) is preferred to a point-to-point distortion of compressed point cloud, as being closer to the user experience. More precisely a pixel-to-pixel distance metrics is evaluated between rendered frames before and after volumetric video compression, and averaged on those frames belonging to a path of pre-defined viewports. In other variants, other criteria may be considered according to the properties of the video stream which have to be guaranteed or optimized.

A pseudo code of method 80 may be:

```
int nb_seg = 1;              // initial number of point cloud segments
int pc1 = 1;                 // index of first point cloud of current segment
int pc2 = Nmin;              // index of last point cloud of current segment
int n;                       // number of added point clouds (to minimum-
                             size segment)
int Nmin = 8;                // minimum length of a point cloud segment
int Nmax = 256;              // maximum length of a point cloud segment
int P1, P[ ];                // number of patches in current patch set
PatchSet S1, S[ ];           // candidate patch sets in current segment
PatchSet SS[ ];              // selected patch sets (one per segment)
float rdcrit;                // rate-distortion criterion to minimize
for (;;) {
   // enlarge incrementally point cloud segment length
   for (n = 0;; n++, pc2++) {
       (P1, S1) = ConstructAtlas(pc1, pc2);
       if ((n > 0) && (P1 > P[n-1]) {n--; break};     // patch number increases, exit
       P[n] = P1; S[n] = S1;                          // store current patch set and continue
       if (pc2-pc1+1 == Nmax) break;                  // maximum segment length attained, exit
       if (pc2 == PCMAX) break;                       // end of point cloud sequence, exit
   }
   // select best candidate patch set (among n+1 per current segment)
   float rdcrit_min = EncodeVideoAtlases(S[n]);
   n_best = n;
   for (i = n-1; i >= 0; i--) {
       if (CheckAtlasValidity(S[n]) {                 // verify patch set is valid for entire
segment
           rdcrit = EncodeVideoAtlases(S[i]);
           if (rdcrit < rdcrit _min) {
              n_best = i;
              rdcrit _min = rdcrit;
           }
       }
   }
   SS[nb_seg-1] = S[n_best];
   // jump to next point cloud segment
   if (pc2 > PCMAX) break;                            // end of point cloud sequence, exit
   nb_seg++;                                          // one more segment
   pc1 = pc2;
   pc2 = min(pc1 + Nmin -1, PCMAX);
}
```

The depth and texture atlas videos which are generated by the above described projection method can be encoded at step 88 with any conventional video encoding standardized method, e.g. HEVC. Those atlas videos have specific properties, however, which are inherent to their generation process: in between two atlas structure updates, the video content is highly temporally correlated, as the frames consist of the same layout of patches (e.g. rectangular), comprising the partial projections of depth or texture. Atlas layout updates for a new group of input 3D scenes break the temporal consistency and can be described as "scene cuts". Such property can be exploited for an optimized compression efficiency by setting accordingly the adequate encoding parameters.

A typical temporal organization of the different types (I, P, B) of encoded picture is based on Group of Pictures (GOP). Typically, a GOP is 8-picture long. An intra period is usually made of several GOPs.

To benefit from the temporal predictability of frames in atlas videos, the method according to the present principles aligns a variable GOP and intra period structure with the atlas updates, with a new intra period starting at each atlas update.

Figure 9:
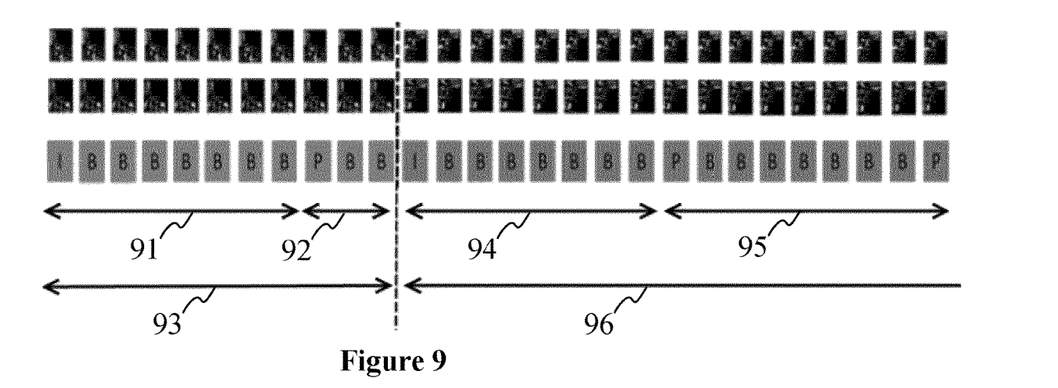
FIG. 9 shows an example structure for intra-periods for atlas layouts of varying lifetime, according to a non-limitative embodiment of the present principles.

FIG. 9 shows an example structure for intra-periods for atlas layouts of varying lifetime N. In this example, an intra-period begins with a first fixed-size k-picture long GOP. For example, k is equal to 8 or 10. (|N/k|−1) fixed-size GOPs follow. The last GOP of the intra-period is of shortened length N modulo the fixed size. In the example of FIG. 9, a GOP contains 8 pictures. A first intra-period 93 contains a first GOP 91 of 8 atlases and a shortened GOP 92 of 3 atlases. GOP 92 has been shortened because appending the next atlas to this sequence would have increase the number of patches and so, modified the layout. FIG. 9 shows another intra-period 96 comprising two GOP 94 and 95 of eight pictures. At this stage, intra-period 96 is not yet closed and will receive at least another GOP, maybe shortened.

Such a structure may be embedded in generic elements of ISOBMMF syntax, for example, to transmit un-projection parameters metadata of varying duration described according to the present principles. The un-projection parameters for a given patch-based projection surface, including list of patches with their characteristics (i.e. patch data items) and associated atlas packing of patches (layout metadata), are defined as a metadata sample, with a structured sample format. The un-projection metadata samples are placed in a timed metadata track, with samples of varying duration. The two video tracks of atlas-based projection of depth and texture are combined in a track group. The un-projection metadata track is linked to the projected video track group through a track reference (i.e. with a 'cdtg' track reference).

The duration of timed metadata samples not matching the duration of associated video samples, the synchronizing of a projected depth/texture video frame and the associated un-projection metadata at rendering side are resolved by parsing the sample decoding times.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
   a. determining, via a device, a first atlas layout for a first sequence of three-dimensional ('3D') scenes,
   wherein an atlas layout defines an organization of at least one patch within an atlas;
   an atlas is a picture packing at least one patch of a same 3D scene; and
   a patch is an image representative of a projection of a part of a 3D scene onto an image plane;
   b. determining, via the device, a second atlas layout for a second sequence of 3D scenes, the second sequence being the first sequence to which one 3D scene is appended;
   on condition that the number of patches of the second atlas layout is lower than or equal to the number of patches of the first atlas layout, using the second sequence as a first sequence for iterating steps a and b;
   otherwise, generating a sequence of atlases for the first sequence of 3D scenes according to the first atlas layout and encoding the generated sequence in a data stream.

2. The method of claim 1, further comprising:
   storing the first atlas layout at each iteration; and
   selecting a layout among the stored layouts to generate the sequence of atlases for the first sequence of 3D scenes when iterations end.

3. The method of claim 2, wherein the selecting of a layout is performed on the basis of a rate-distortion optimization criterion.

4. The method of claim 1, wherein iterations end when the second sequence of 3D scenes comprises more than a given number of 3D scenes.

5. The method of claim 1, wherein the generated sequence of atlases is encoded as one intra-period in a video data stream.

6. The method of claim 5, wherein the intra-period comprises at least one group of pictures comprising a number of atlases equal to the number of scenes of the initial first sequence of 3D scenes.

7. A device comprising a memory storing instructions to cause a processor to:
   a. determine a first atlas layout for a first sequence of 3D scenes
   wherein an atlas layout defines an organization of at least one patch within an atlas;
   an atlas is a picture packing at least one patch of a same 3D scene; and a patch is an image representative of a projection of a part of a 3D scene onto an image plane;
b. determine a second atlas layout for a second sequence of 3D scenes, the second sequence being the first sequence to which one 3D scene is appended;
   on condition that the number of patches of the second atlas layout is lower than or equal to the number of patches of the first atlas layout, use the second sequence as a first sequence for iterating steps a and b;
   otherwise generate a sequence of atlases for the first sequence of 3D scenes according to the first atlas layout and encode the generated sequence in a data stream.

8. The device of claim 7, wherein the instructions are configured to cause the processor to:
   store the first atlas layout at each iteration in the memory; and
   select a layout among the stored layouts to generate the sequence of atlases for the first sequence of 3D scenes when iterations end.

9. The device of claim 8, wherein the selecting of a layout is performed on the basis of a rate-distortion optimization criterion.

10. The device of claim 7, wherein iterations end when the second sequence of 3D scenes comprises more than a given number of 3D scenes.

11. The device of claim 7, wherein the instructions are configured to cause the processor to encode the sequence of generated atlases as one intra-period in a video data stream.

12. The device of claim 11, wherein the group of pictures comprises at least one group of pictures comprising a number of atlases equal to the number of scenes of the initial first sequence of 3D scenes.

* * * * *